United States Patent
Kim

(10) Patent No.: US 9,046,989 B2
(45) Date of Patent: Jun. 2, 2015

(54) MOBILE TERMINAL AND ICON CONTROL METHOD FOR THE SAME

(75) Inventor: Jeong Yeol Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 13/049,262

(22) Filed: Mar. 16, 2011

(65) Prior Publication Data

US 2011/0239145 A1    Sep. 29, 2011

(30) Foreign Application Priority Data

Mar. 26, 2010 (KR) ........................ 10-2010-0027138

(51) Int. Cl.
*G06F 3/048* (2013.01)
*G06F 3/0481* (2013.01)
*G06F 3/0488* (2013.01)
*G06F 3/0484* (2013.01)

(52) U.S. Cl.
CPC .......... *G06F 3/04817* (2013.01); *G06F 3/0488* (2013.01); *G06F 3/04842* (2013.01)

(58) Field of Classification Search
CPC .... G06F 9/4443; G06F 3/0481; G06F 3/0482
USPC ........................................................ 715/765
See application file for complete search history.

(56) References Cited

U.S. PATENT DOCUMENTS

| | | | |
|---|---|---|---|
| 6,243,724 B1* | 6/2001 | Mander et al. ................ | 715/273 |
| 6,618,063 B1* | 9/2003 | Kurtenbach .................. | 715/834 |
| 7,770,120 B2* | 8/2010 | Baudisch ...................... | 715/740 |
| 2003/0189602 A1* | 10/2003 | Dalton et al. ................. | 345/830 |
| 2006/0041847 A1* | 2/2006 | Maw .............................. | 715/793 |
| 2007/0094620 A1 | 4/2007 | Park | |
| 2008/0307335 A1 | 12/2008 | Chaudhri et al. | |
| 2008/0307360 A1* | 12/2008 | Chaudhri et al. ............. | 715/835 |
| 2009/0064047 A1 | 3/2009 | Shim et al. | |
| 2009/0193363 A1* | 7/2009 | Atherton ....................... | 715/835 |
| 2009/0307623 A1* | 12/2009 | Agarawala et al. .......... | 715/765 |
| 2009/0319951 A1* | 12/2009 | Benedetti et al. ............ | 715/837 |
| 2011/0029907 A1* | 2/2011 | Bakhash ....................... | 715/769 |

FOREIGN PATENT DOCUMENTS

| | | |
|---|---|---|
| CN | 1855021 A | 11/2006 |
| JP | 2007-58272 A | 3/2007 |

OTHER PUBLICATIONS

Rotating Icon Selector, IBM Technical Disclosure Bulletin, International Business Machines Corp. Jul. 1, 1994, 59-60, vol. 37, No. 7, Thronwood, US.

* cited by examiner

*Primary Examiner* — Nicholas Augustine
(74) *Attorney, Agent, or Firm* — Jefferson IP Law, LLP

(57) ABSTRACT

A mobile terminal and an icon control method for the same are provided. The icon control method includes detecting a selection event in relation to displayed icons, determining, when the selection event is detected, a number of icons mapped to a zone in which the selection event is detected, and changing, when the number of icons mapped to the zone is greater than one, an order of the multiple icons mapped to the zone for successive icon display according to a time during which contact is maintained after the selection event. When multiple displayed icons overlap each other on a display screen, a user can easily select a desired one of the overlapping icons without having to move any of the icons.

10 Claims, 4 Drawing Sheets

MOBILE TERMINAL AND ICON CONTROL METHOD FOR THE SAME

PRIORITY

This application claims the benefit under 35 U.S.C. §119 (a) of a Korean patent application filed on Mar. 26, 2010 in the Korean Intellectual Property Office and assigned Serial No. 10-2010-0027138, the entire disclosure of which is hereby incorporated by reference.

BACKGROUND OF THE INVENTION

1. Field of the Invention

The present invention relates to an icon control method for a mobile terminal. More particularly, the present invention relates to a mobile terminal capable of displaying multiple icons and to a method for controlling displayed icons according to an input event in the mobile terminal.

2. Description of the Related Art

With popularization of mobile terminals, terminal manufacturers and service providers provide mobile terminals with various functions to satisfy diversified user requirements. For example, an advanced mobile terminal may provide not only communication functions related to voice calls, video calls, and messages, but also supplementary functions related to schedule management, gaming, digital broadcast reception, photography and Internet access, for example. Such a mobile terminal typically provides various icons to enable the user to easily select a desired function.

As the number of icons increases, a mobile terminal may be unable to clearly display all icons simultaneously on a single screen. When multiple icons are displayed on the screen, some of them may overlap each other. To utilize a bottommost one of the overlapping icons, the user is inconvenienced by having to move the other overlapping icons out of the way before the user can select the bottommost icon.

SUMMARY OF THE INVENTION

An aspect of the present invention is to address at least the above-mentioned problems and/or disadvantages and to provide at least the advantages described below. Accordingly, an aspect of the present invention is to provide a method that enables the user to conveniently control displayed icons in a mobile terminal.

In accordance with an aspect of the present invention, an icon control method for a mobile terminal is provided. The method includes, detecting a selection event in relation to displayed icons, determining, when a selection event is detected, a number of icons mapped to a zone in which the selection event is detected, and changing, when the number of icons mapped to the zone is greater than one, the order of the multiple icons mapped to the zone for successive icon display according to a duration of time during which contact is maintained (contact maintenance time) after the selection event.

The icon control method may further include identifying, when a release event related to the selection event is detected, a topmost one of the multiple icons mapped to the zone, and carrying out an operation utilizing the identified icon according to a user action.

Changing the order of the multiple icons may include determining whether the contact maintenance time after the selection event is greater than or equal to a preset threshold time, and updating, when the contact maintenance time is greater than or equal to the threshold time, the order of the multiple icons, so that a second topmost one of the multiple icons becomes the topmost one.

Updating the order of the multiple icons may include altering the order of the multiple icons so that a topmost one of the multiple icons and a second topmost one thereof respectively become the bottommost one and the topmost one.

In accordance with another aspect of the present invention, a mobile terminal is provided. The terminal includes, a display unit for displaying at least one icon, an input unit for detecting a selection event and a release event in relation to the at least one icon, and a control unit for determining, when a selection event is detected through the input unit, a number of icons mapped to a zone in which the selection event is detected, and for controlling, when the number of icons mapped to the zone is greater than one, the display unit to change the order of the multiple icons mapped to the zone for successive icon display according to a duration of time during which contact is maintained (contact maintenance time) after the selection event.

The control unit may identify, when a release event related to the selection event is detected through the input unit, a topmost one of the multiple icons mapped to the zone, and carry out an operation utilizing the identified icon according to a user action.

The control unit may determine whether the contact maintenance time after the selection event is greater than or equal to a preset threshold time, and control, when the contact maintenance time is greater than or equal to the threshold time, the display unit to update the order of the multiple icons so that a second topmost one of the multiple icons becomes the topmost one.

The control unit may control, when the contact maintenance time is longer than or equal to the threshold time, the display unit to alter the order of the multiple icons so that a topmost one of the multiple icons and a second topmost one thereof respectively become the bottommost one and the topmost one.

In an exemplary embodiment of the present invention, when multiple displayed icons overlap each other on the screen, the user can easily select a desired one of the overlapping icons without moving any of the icons. In addition, the user can readily identify the attributes of each overlapping icon.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Particular terms may be defined herein to describe the invention in the best manner. Accordingly, the meaning of specific terms or words used in the specification and the claims should not be limited to the literal or commonly employed sense, but should be construed in accordance with the spirit of the invention.

In the description, a "mobile terminal" includes a terminal that can send and receive data to and from another terminal and perform various functions, and maybe, for example, a laptop computer, a Motion Picture Experts Group (MPEG)-2 Audio Layer 3 (MP3) player, a portable multimedia player, or a cellular phone.

An "icon" includes a displayed image indicating an application or function provided by the mobile terminal so that the user may intuitively identify such application or function. Icons may be associated with specific functions.

Figure 1:
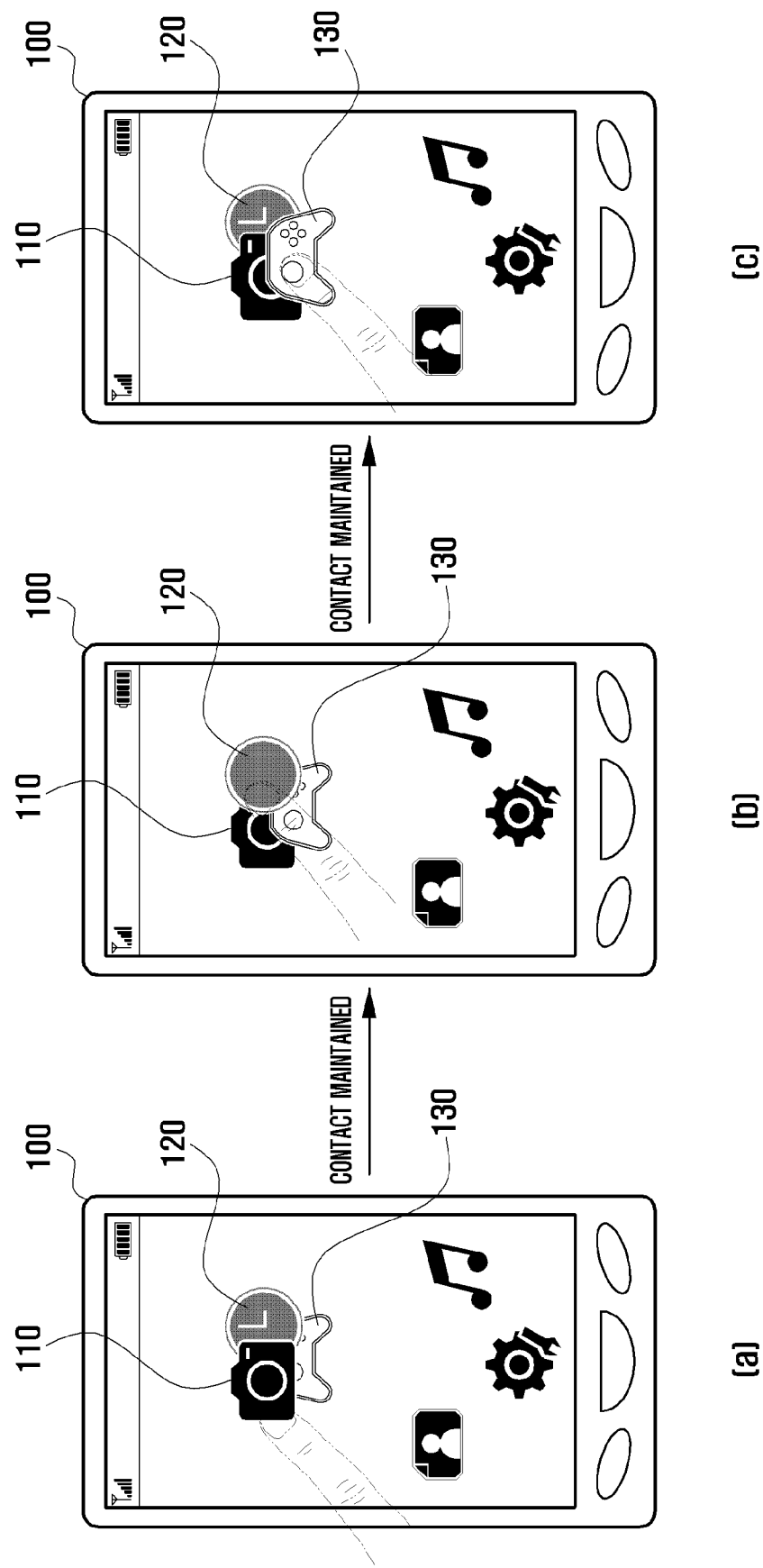
FIG. 1 illustrates an arrangement of icons on a screen according to an exemplary embodiment of the present invention.

FIG. 1 illustrates an arrangement of icons on a screen of a mobile terminal according to an exemplary embodiment of the present invention.

Referring to FIG. 1, the mobile terminal 100 may display a plurality of icons. As indicated by reference symbol [a], a first icon 110, a second icon 120 and a third icon 130 are displayed so as to overlap each other. More specifically, the first icon 110 is displayed at a first location at least partially superimposed over the second icon 120; the second icon 120 is displayed at a second location at least partially superimposed over the third icon 130; and the third icon 130 is displayed at a third location at least partially below the second icon 120 and third icon 130.

When the user touches a zone at which the first icon 110, second icon 120 and third icon 130 are displayed and maintains contact with the zone for at least a preset duration of time, an order of the first icon 110, the second icon 120, and the third icon 130 may be rearranged as indicated by reference symbol [b]. More specifically, when the touch is made in the zone at which the icons are displayed and the contact is sustained for at least the preset duration of time, the orders of the first icon 110, the second icon 120, and the third icon 130 are changed respectively to be the third location (previous location of the third icon 130), the first location (previous location of the first icon 110) and the second location (previous location of the second icon 120).

Thereafter, when contact is further sustained for another preset duration of time, the order of the first icon 110, the second icon 120 and the third icon 130 may be arranged as indicated by reference symbol [c]. More specifically, the orders of the first icon 110, the second icon 120 and the third icon 130 are moved respectively to the second location (previous location of the third icon 130), the third location (previous location of the first icon 110), and the first location (previous location of the second icon 120). In this exemplary embodiment, the second preset duration of time may be the same as the first preset duration of time. In this exemplary embodiment, the preset durations of time may be determined in accord with a user's input.

As described above, in the present invention, an order of multiple overlapping icons on the screen may be rearranged and displayed in sequence according to the duration of time for which contact is maintained (contact maintenance time) after a touch is made. Hence, the user may easily select one of the overlapping icons associated with a desired function. Although multiple overlapping icons are described above as being rearranged and displayed in a sequence without changing a coordinate position of the icons on the screen, the present invention is not limited thereto or thereby. For example, when contact is sustained for a preset duration of time after a selection event is entered, multiple overlapping icons may be spread on the screen in a non-overlapping manner. In this exemplary embodiment, the spread icons may preferably be spread in a row. In this exemplary embodiment, when multiple overlapping icons are rearranged and displayed in sequence according to the duration of time for which contact is maintained after a selection event is entered, a brief description of an executable function associated with the topmost icon may also be displayed, for example, as a pop-up.

Next, a description is given of a configuration of a mobile terminal capable of performing the procedure depicted above according to an exemplary embodiment of the present invention.

Figure 2:
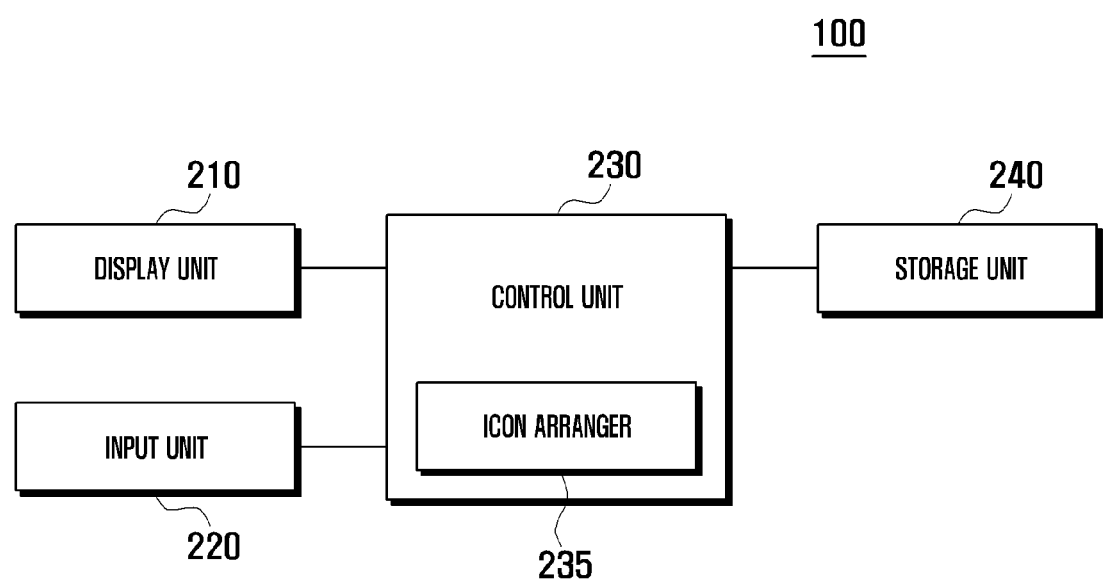
FIG. 2 is a block diagram of a mobile terminal according to an exemplary embodiment of the present invention.

FIG. 2 is a block diagram of the mobile terminal 100 according to an exemplary embodiment of the present invention.

Referring to FIG. 2, the mobile terminal 100 includes a display unit 210, an input unit 220, a control unit 230, and a storage unit 240.

The display unit 210 displays data regarding states and operations of the mobile terminal 100. In particular, the display unit 210 displays a plurality of icons under the control of the control unit 230. Under the control of the control unit 230, the display unit 210 may rearrange an order of multiple overlapping icons so that they are displayed in a sequence.

The input unit 220 receives alphanumeric information and input events from the user for setting various functions and for controlling the mobile terminal 100, and forwards the received information and events to the control unit 230. The input unit 220 may include a touch screen detecting touch events through a touch sensor or a keypad of physical keys. An input event may be a selection event generated by the user to select a zone in which overlapping icons are displayed, or a release event indicating cancellation of a selection event. For example, the input unit 220 may detect a selection event for selecting overlapping icons and send the selection event to the control unit 230. The input unit 220 may detect a release event indicating cancellation of the selection event.

In the description of the exemplary embodiment, the input unit 220 is assumed to have a touch screen capability. However, the present invention is not limited thereto. For example, in the case that the input unit 220 has a touch screen capability, when a touch is detected in a zone in which an icon is displayed, the input unit 220 may regard the touch as a selection event and send the coordinates of the touched zone to the control unit 230. In the case that the input unit 220 includes a physical keypad, when a zone in which an icon is displayed is selected through a directional key of the keypad, the input unit 220 may send a selection event to the control unit 230.

The control unit 230 controls overall operations and states of the individual components of the mobile terminal 100. In particular, the control unit 230 may control the display unit 210 to display icons associated with specific functions of the mobile terminal 100. When two or more icons overlap each other on the display unit 210, the control unit 230 may rearrange the order of the overlapping icons for successive display, according to an input event detected by the input unit 220. To achieve this, the control unit 230 may include an icon arranger 235.

The icon arranger 235 controls two or more overlapping icons displayed on the display unit 210 according to a detected input event. More specifically, when a selection event is detected by the input unit 220, the icon arranger 235 determines whether two or more icons are mapped to the selected zone. When two or more icons are mapped to the selected zone, the icon arranger 235 determines whether contact with the zone is maintained for a preset threshold duration of time or more. Here, the threshold duration of time is used to control overlapping icons for successive display, and in the exemplary embodiment is preferably set to about 2 seconds.

When contact is maintained for the threshold duration of time or more, the icon arranger 235 controls the display unit 210 to rearrange the order of the overlapping icons for successive display. For example, when a first icon and second icon overlap each other on the display unit 210, the icon arranger 235 controls the display unit 210 to display the first icon above the second icon or to display the second icon above the first icon, according to the contact maintenance time after the detection of the selection event.

Alternatively, when contact is sustained for a preset duration of time after a selection event is detected for multiple overlapping icons, the control unit 230 may control the display unit 210 to spread the overlapping icons on the screen in a non-overlapping manner. When multiple overlapping icons are rearranged for successive display according to the contact maintenance time after the detection of the selection event, the control unit 230 may control the display unit 210 to display a brief description of an executable function associated with the topmost icon. In this exemplary embodiment, the brief description may preferably be displayed as a pop-up.

The storage unit 240 stores application programs and related data for executable functions of the mobile terminal 100. In particular, the storage unit 240 stores icons associated with the individual functions.

The mobile terminal 100 having the above-described configuration, in a mode in which a plurality of icons may be displayed (such as a widget mode), may rearrange the order of overlapping icons for successive display according to the contact maintenance time after the detection of the selection event through the input unit 220. Next, an icon control method is described in connection with FIG. 3.

Figure 3:
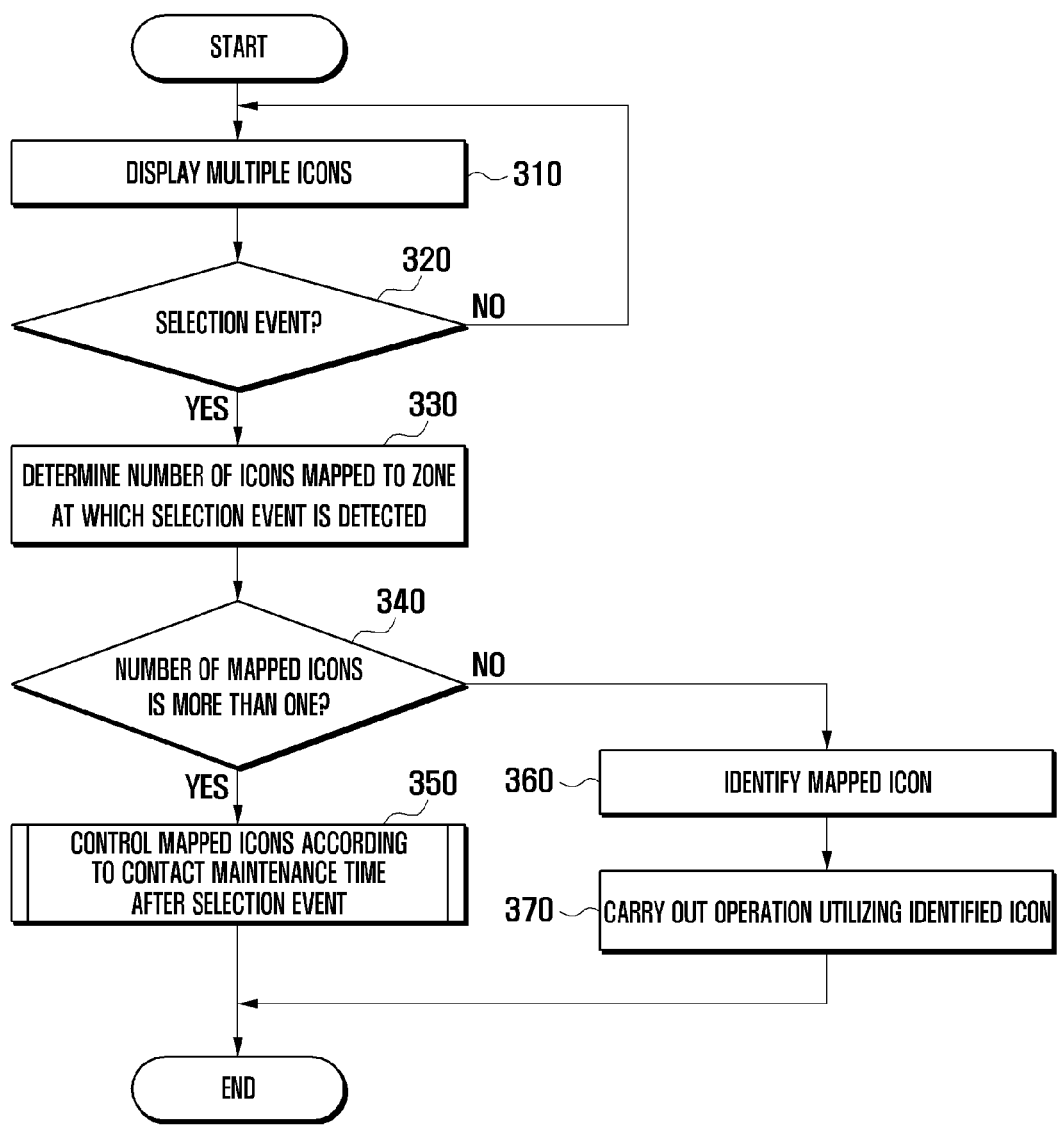
FIG. 3 is a flowchart of an icon control method according to an exemplary embodiment of the present invention.

FIG. 3 is a flowchart of an icon control method according to an exemplary embodiment of the present invention.

Referring to FIG. 3, the control unit 230 of the mobile terminal 100 controls the display unit 210 to display multiple icons in a widget mode or a menu mode selected by the user at step 310. The control unit 230 determines whether a selection event for icon selection is detected through the input unit 220 at step 320. When the input unit 220 has a touch screen capability, the control unit 230 may regard a touch event detected by a touch sensor as a selection event. When the input unit 220 includes a physical keypad, the control unit 230 may regard a preset key input from the keypad as a selection event.

When a selection event is detected, the control unit 230 determines the number of icons mapped to the zone at which the selection event is detected at step 330. The control unit 230 determines whether the number of mapped icons is greater than one at step 340. When the number of mapped icons is greater than one, the control unit 230 controls the mapped icons according to the contact maintenance time after the detection of the selection event at step 350. Step 350 is described in further detail below in connection with FIG. 4.

When the number of mapped icons is not greater than one, the control unit 230 identifies the mapped icon at step 360, and carries out an operation utilizing the identified icon at step 370. For example, when contact is still sustained after the selection event, the control unit 230 may enlarge the identified icon. Thereafter, when a movement event is detected while the contact is maintained, the control unit 230 may move the enlarged icon to a corresponding location. Alternatively, when a release event related to the selection event is detected, the control unit 230 may perform a function associated with the identified icon. For example, when a photo-view function is associated with the identified icon, the control unit 230 performs the photo-view function, which enables the user to view stored photographs, in response to the release event.

Figure 4:
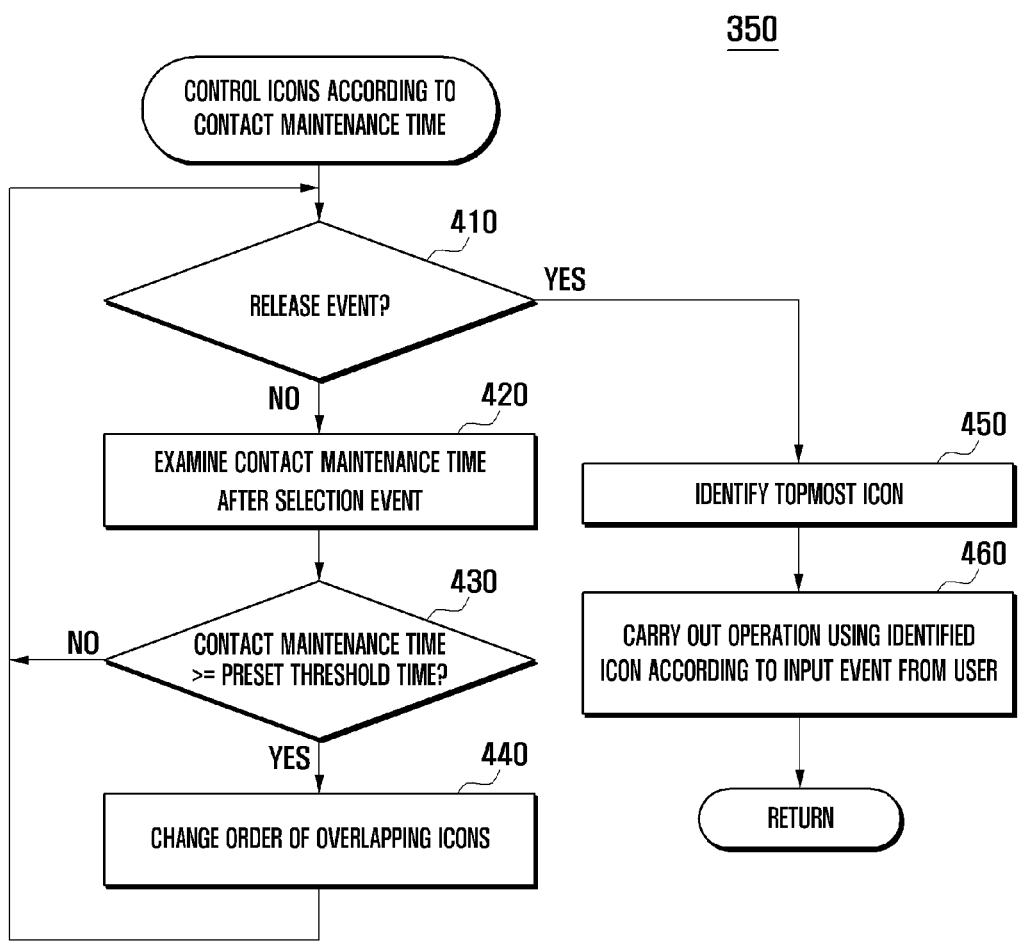
FIG. 4 is a flowchart of an icon display step in the method of FIG. 3 according to an exemplary embodiment of the present invention.

Next, a description is given of an exemplary method of controlling multiple overlapping icons on the screen in connection with FIG. 4.

FIG. 4 is a flowchart of icon display step 350 in the method of FIG. 3 according to an exemplary embodiment of the present invention.

Referring to FIG. 4, the control unit 230 determines whether a release event is detected at step 410. That is, the control unit 230 determines whether a release event related to the previous selection event is detected through the input unit 220. For example, when the input unit 220 has a touch screen capability, to detect a release event, the control unit 230 may determine whether the touch (selection event) of the input unit 220 has ended. When the input unit 220 includes a keypad, to detect a release event, the control unit 230 may determine whether another key is entered through the keypad.

When a release event is not detected, the control unit 230 examines the contact maintenance time after the selection event at step 420. The control unit 230 determines whether the contact maintenance time is longer than or equal to a preset threshold time at step 430. Here, the threshold time is used to control overlapping icons for successive display, and in the exemplary embodiment is preferably set to about 2 seconds.

When the contact maintenance time is longer than or equal to the threshold time, the control unit 230 changes the order of the overlapping icons at step 440. Here, the order of the overlapping icons is rotated so that the topmost icon and the second-topmost icon respectively become the bottommost icon and the topmost icon. For example, assume that a first icon, a second icon and a third icon overlap each other on the screen and the threshold time is set to 2 seconds. The control unit 230 determines the contact maintenance time after a selection event is detected in a zone in which the overlapping icons are located, and changes the order of the overlapping icons once every 2 seconds. That is, after 2 seconds without detection of a release event, the orders of the first icon, the second icon and the third icon are moved so that the first icon, the second icon and the third icon respectively become the bottommost one, the topmost one and the second topmost one. After another 2 seconds without detection of a release event, the first icon, the second icon and the third icon are moved so that the first icon, the second icon and the third icon respectively become the second topmost one, the bottommost one and the topmost one. In this way, the order of overlapping icons is repeatedly changed on the screen. Hence, the user may easily select a desired one of the overlapping icons.

When a release event is detected at step 410, the control unit 230 identifies a topmost one of the overlapping icons at step 450. The control unit 230 performs an operation using the identified icon according to an input event from the user at step 460. For example, when a select event is immediately followed by a release event, the control unit 230 may carry out the function associated with the identified icon. When a selection event is immediately followed by a drag event, the control unit 230 may move the identified icon to a corresponding location.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. An icon control method for selecting an overlapped application icon without changing a coordinate position of the application icon on a mobile terminal, the method comprising:
    displaying at least two or more overlapping application icons on the mobile terminal screen;
    detecting a first input signal with respect to an application icon;
    determining whether the first input signal lasts for a preset time;
    determining, when the first input signal lasts for the preset time, whether the application icon is overlapped with at least one other application icon;
    changing, when the application icon is overlapped with at least one other application icon, an order of the application icon and at least one other application icon by positioning a second topmost application icon at a topmost position and a first topmost application icon at a bottommost position;
    continuing to rearrange the sequence of overlapping icons according to the duration of time for which contact is maintained;
    detecting a second input signal on an application icon at the topmost position; and
    executing, when the second input signal is detected, an application corresponding to the application icon at the topmost position.

2. The method of claim 1, wherein the second input signal is an input signal which does not last for the preset time.

3. The method of claim 1, wherein the changing of the order of the overlapped application icon and at least one other application icon is repeated at each instance when it is determined that a duration of the first input signal increases by an additional period of time longer than or equal to the preset time.

4. The method of claim 1, wherein the preset time is set by a user of the mobile terminal.

5. The method of claim 1, further comprising displaying a description of an executable function regarding to the overlapped application icon at the topmost position.

6. A mobile terminal comprising:
    a display unit configured to display at least two or more overlapping application icons;
    an input unit configured to detect an input signal with respect to the overlapped application icons; and
    a control unit configured to determine whether a first input signal lasts for a preset time, to determine, when the first input signal lasts for the preset time, whether the overlapped application icon is overlapped with at least one other application icon, to change, when the overlapped application icon is overlapped with at least one other application icon, an order of the overlapped application icon and the at least one other application icon without changing a coordinate position of the application icon by positioning a second topmost application icon at a topmost position and a first topmost application icon at a bottommost position, to continue to rearrange the sequence of overlapping icons according to the duration of time for which contact is maintained, to detect a second input signal on an overlapped application icon at the topmost position, and to execute, when the second input signal is detected, an application corresponding to the overlapped application icon at the topmost position.

7. The mobile terminal of claim 6, wherein the second input signal is an input signal which does not last for the preset time.

8. The mobile terminal of claim 6, wherein the control unit is configured to change the order of the overlapped application icon and the at least one other application icon repeatedly at each instance when it is determined that a duration of the first input signal increases by an additional period of time longer than or equal to the preset time.

9. The mobile terminal of claim 6, wherein the preset time is set by a user of the mobile terminal.

10. The mobile terminal of claim 6, wherein the control unit is configured to control the display unit to display a description of an executable function with respect to the overlapped application icon at the topmost position.

* * * * *